W. E. GILMORE.
AUTOMOBILE.
APPLICATION FILED SEPT. 11, 1912.
1,107,057.
Patented Aug. 11, 1914.
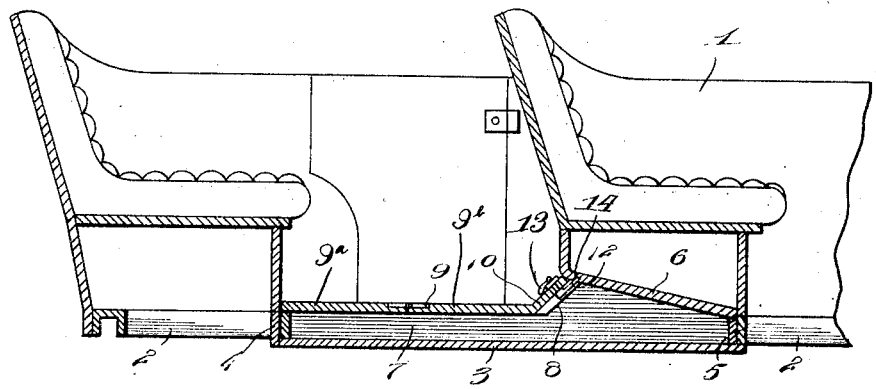
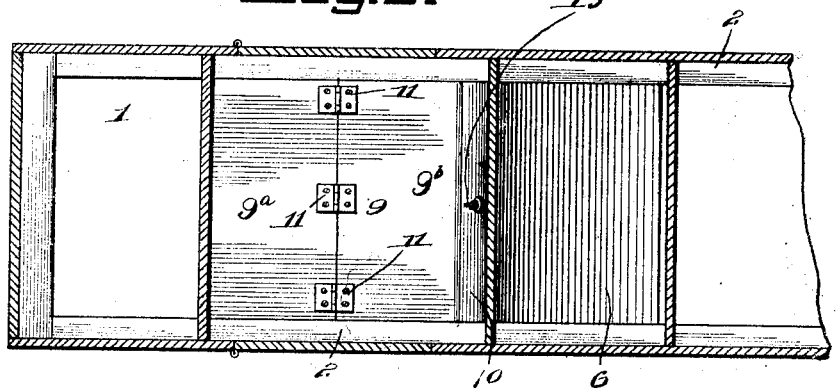
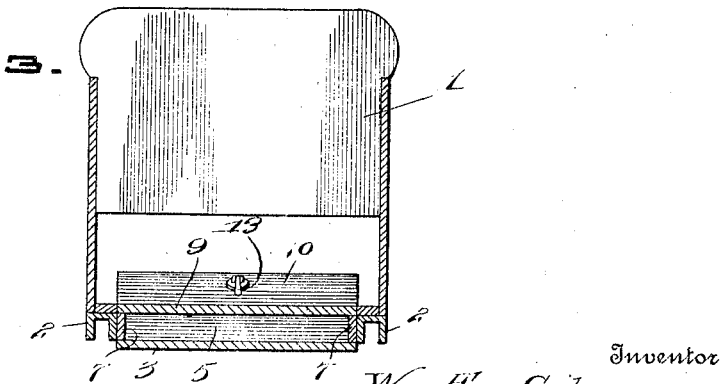

UNITED STATES PATENT OFFICE.

WILLIAM E. GILMORE, OF HOLMESVILLE, OHIO.

AUTOMOBILE.

1,107,057.

Specification of Letters Patent.

Patented Aug. 11, 1914.

Application filed September 11, 1912. Serial No. 719,853.

*To all whom it may concern:*

Be it known that I, WILLIAM E. GILMORE, a citizen of the United States, residing at Holmesville, in the county of Holmes and State of Ohio, have invented new and useful Improvements in Automobiles, of which the following is a specification.

The present invention relates to automobiles, the object being to provide an ordinary automobile with a compartment which is adapted for the reception of the spare wheel.

I also aim to provide a compartment for this purpose which is so arranged as to not interfere with the working parts of the machine, and which is provided with a cover that forms the floor for the rear seat of the automobile.

With the above recited objects in view and others which will appear as the nature of the invention is more fully understood, the improvement resides in the construction, combination and operative arrangement of parts set forth in the following description, and falling within the scope of the appended claims.

In the drawing, Figure 1 is a central longitudinal sectional view taken through the rear portion of an automobile constructed in accordance with the present invention. Fig. 2 is a top plan view of the same. Fig. 3 is a transverse sectional view through the same.

Referring now to the drawing in detail, the numeral 1 designates the body of an ordinary automobile which is provided with a front seat and a rear seat. The body has its lower portion provided with a continuous cross sectional U-shaped rail 2 which supports the front or plumb boards of the seats. Secured to the front or outer face of the front or plumb board of the rear seat is a cleat 4, and likewise secured to the lower inner face of the front seat is a similar cleat 5, while arranged parallel with the opposite longitudinal rails 2 are side members 7 which connect with cleats 4 and 5. The cleats are of a width approximately corresponding with that of the rails 2, and the cleats and sides 7 provide a frame for a compartment. The side members 7 below the front seat are inclined rearwardly and upwardly from their connection with the cleats 5, the said inclined edges terminating a slight distance from the rear plumb board of the said front seat, and connected with the plumb board is a flat member 6 which rests upon the cleats 5 and upon the inclined edges of the side members 7. The aforementioned inclined portions of the sides 7 terminate in downwardly inclined edges 8, and the numeral 3 designates a bottom board which is secured to both the side 7 and the transverse cleat 4 and 5 of the compartment.

The numeral 9 designates the cover for the compartment, which also forms a floor for the body between the front and rear seats. The member 9 rests upon the side members 7 and upon the cleat 4, the said member having its front portion provided with an inclined lip 10 which conforms to the inclination of the side members 7 and which may rest upon the said edges or upon suitable strips or cleats secured to the sides at the edges 8. The member 9 preferably comprises two members 9ª and 9ᵇ which are hingedly connected, as at 11, the member 9ᵇ being provided with the lip or inclined portion 10. The lip has secured thereto a spring latch 12 provided with a suitable operating handle or knob 13, and the member 6 is either recessed or otherwise provided with a keeper 14 for the latch. The compartment may contain an additional tire or tires for the automobile, together with other accessories, etc., and by constructing the closure 9 in two sections, either of the sections may be swung to an open position so that the contents of the compartment arranged to either the forward or the rear portion thereof may be accessible without entirely removing the closure.

Having thus described the invention, what I claim is:—

1. An automobile body having front and rear seats, a frame arranged between the plumb boards of the front and the rear seats, a bottom connected with the frame, a cover for the frame providing the floor for the automobile between the seats, said cover comprising a pair of hinged sections, and a lock for one of the sections.

2. In combination, a vehicle body including front and rear seats, a frame arranged between the plumb boards of the seats, a bottom for the frame, the side members of the frame below the front seat being inclined from the plumb board upwardly toward the rear of said front seat, a cover for the said inclined portions of the frame, the upwardly inclined edges terminating in downwardly and rearwardly inclined edges which intersect the upper horizontal edges of the said side members, a cover for the frame, said cover providing the floor of the vehicle between the seats, said cover comprising a pair of hinged sections, one of said sections having an inclined lip which is adapted to rest upon the downwardly inclined edges of the side members of the frame, and a latch arranged upon the lip for locking one of the sections of the cover to the vehicle.

In testimony whereof I affix my signature in presence of two witnesses.

WIILIAM E. GILMORE.

Witnesses:
W. G. CLOSE,
J. M. TEISHER.